(12) United States Patent
Nekkanti et al.

(10) Patent No.: US 12,106,306 B2
(45) Date of Patent: Oct. 1, 2024

(54) REAL-TIME MISAPPROPRIATION DETECTION AND EXPOSURE ASSESSMENT SYSTEM

(71) Applicant: BANK OF AMERICA CORPORATION, Charlotte, NC (US)

(72) Inventors: Tulasi Bhavani Nekkanti, Telangana (IN); Sunil Bhashetty, Telangana (IN); Satyabrata Pradhan, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 177 days.

(21) Appl. No.: 17/518,138

(22) Filed: Nov. 3, 2021

(65) Prior Publication Data
US 2023/0135558 A1 May 4, 2023

(51) Int. Cl.
*G06Q 20/40* (2012.01)
*G06Q 20/20* (2012.01)

(52) U.S. Cl.
CPC ......... *G06Q 20/4016* (2013.01); *G06Q 20/20* (2013.01); *G06Q 20/4015* (2020.05); *G06Q 20/405* (2013.01)

(58) Field of Classification Search
None
See application file for complete search history.

(56) References Cited

U.S. PATENT DOCUMENTS

| | | | |
|---|---|---|---|
| 6,847,393 B2 | 1/2005 | Ashe et al. | |
| 8,554,631 B1 | 10/2013 | Barton et al. | |
| 8,600,881 B2 | 12/2013 | Nguyen et al. | |
| 9,626,679 B2 | 4/2017 | Bhorania et al. | |
| 10,699,273 B2 | 6/2020 | Mahaffey et al. | |
| 11,074,569 B2 | 7/2021 | Matta | |
| 2007/0174082 A1* | 7/2007 | Singh | H04W 4/02 705/44 |
| 2009/0018940 A1 | 1/2009 | Wang et al. | |
| 2012/0084248 A1* | 4/2012 | Gavrilescu | G06F 16/9535 706/54 |
| 2012/0101937 A1* | 4/2012 | Zoldi | G06Q 40/12 705/38 |

(Continued)

*Primary Examiner* — Ariel J Yu
(74) *Attorney, Agent, or Firm* — Moore & Van Allen PLLC; James C. Edwards

(57) ABSTRACT

Real-time prevention of misappropriation and/or exposure assessment posed by a transaction at a POS terminal, especially those transactions in which it is not possible to otherwise definitively determine that a user/transactor is present at the POS terminal. AI is relied on, such as, a neural network implementing sequence modeling, to predict the likelihood that a user/transactor is present at the POS terminal. Location of a user is tracked via a designated mobile communication device and in instances in which a location of the mobile communication cannot be identified at the time of the transaction, the invention performs analysis based at least on the last-in-time location of the mobile communication device, the user's travel route leading up to the last-in-time location of the mobile communication device and other factors to predict a likelihood that the user is located at the POS terminal. As a result of the predicted likelihood either the transaction is automatically decisioned or the user/transactor is alerted and requested to their approve or reject/deny the transaction.

14 Claims, 9 Drawing Sheets

(56) References Cited

U.S. PATENT DOCUMENTS

| | | |
|---|---|---|
| 2013/0124346 A1 | 5/2013 | Baldwin et al. |
| 2013/0159121 A1 | 6/2013 | May et al. |
| 2014/0213300 A1* | 7/2014 | Spears .................. H04W 4/024 |
| | | 455/456.3 |
| 2014/0279723 A1* | 9/2014 | McGavran ........... G01C 21/362 |
| | | 707/610 |
| 2017/0221058 A1 | 8/2017 | Choudhary et al. |
| 2018/0149486 A1* | 5/2018 | Spears ............... G01C 21/3484 |
| 2020/0005310 A1* | 1/2020 | Kumar ............. G06F 18/23213 |
| 2021/0264432 A1* | 8/2021 | Devdas ............. G06Q 20/4016 |
| 2021/0398127 A1* | 12/2021 | LePage ............. G06Q 20/4016 |

* cited by examiner

REAL-TIME MISAPPROPRIATION DETECTION AND EXPOSURE ASSESSMENT SYSTEM

FIELD OF THE INVENTION

The present invention is generally related to electronic security and, more specifically, a real-time misappropriation detection and exposure assessment for transactions conducted at a POS terminal based at least in on the predicted likelihood that the transactor is located at the POS terminal.

BACKGROUND

Predicting and/or preventing misappropriation at a POS (Point-of-Sale) terminal is a challenging task. In many instances if a user's payment card has been misappropriated and the user is unaware of the misappropriation (i.e., the user has yet to cancel or otherwise report the payment card as being misplaced), the wrongdoer can conducted illicit transactions at a POS terminal.

While steps have been made to prevent such illicit transactions by tracking the location of the user, specifically, tracking the location of the user's designated mobile communication device, and authorizing transactions only if the user and the POS terminal are determined to be co-located, such methods become unreliable when location tracking is unavailable (i.e., the mobile communication is not active/online or location coordinates of the mobile communication device cannot be determined).

Therefore, a need exists to detect misappropriation and/or assess the exposure posed by transactions conducted at POS terminals, specifically transactions in which it is not possible to definitively determine that the user/transactor is located at POS terminal. As such, the desired systems, methods and the like should provide for predicting the likelihood that a user/transactor is located at the POS terminal and providing transaction authorization based, at least in part, on the predicted likelihood of the user/transactor being located at the POS terminal at time of the transaction. Moreover, the systems, methods, and the like need to operate in real-time, such that, transactions can be authorized and/or denied in a highly efficient manner, so as to not a delay the processing of conventional POS terminal transactions.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a highly effective and real-time approach to preventing misappropriation and/or assessing the exposure posed by a transaction at a POS terminal, especially those transactions in which it is not possible to otherwise definitively determine that a user/transactor is present at the POS terminal.

In this regard the invention utilizes Artificial Intelligence (AI), in specific embodiments, a neural network implementing sequence modeling to predict the likelihood that a user/transactor is present at the POS terminal. In this regard, the present invention tracks the location of a user designated mobile communication device (i.e., a mobile telephone, a smart watch or other communication device with location determining means that is typically always in the possession of the user) and in instances in which a location of the mobile communication cannot be identified at the time of the transaction, the invention performs analysis based at least on the last-in-time location of the mobile communication device and the user's travel route leading up to the last-in-time location of the mobile communication device to predict a likelihood that the user is located at the POS terminal. Additional criteria for predicting the likelihood of the user being located at the POS terminal includes previous transactions conducted by the user/transactor at the POS terminal (or the merchant site of the POS terminal), the route taken by the user/transactor for the previous transactions at the POS terminal, the amount of the previous transactions at the POS terminal in comparison to the amount of the current transaction and the like.

As a result of the predicted likelihood, referred to herein as a misappropriation and exposure indicator/score, the present invention may be configured to alert the user/transactor of the pending transaction and request their approval or rejection/denial of the transaction or, in other instances the misappropriation and exposure indicator/score may provide for automated decisioning, whereby the transaction is authorized or rejected/denied based solely on the misappropriation and exposure indicator/score (i.e., without the need to alert or otherwise request the user's/transactor's approval or denial of the transaction).

A system for detecting misappropriation and assessing exposure at a Point-of-Sale (POS) terminal transaction defines first embodiments of the invention. The system includes a mobile communication device that is associated with a user and includes a first memory, a first processing device in communication with the memory and a location determining mechanism in communication with the first processing device. The system additionally includes a POS terminal located at a merchant site and including a second memory and a second processing device in communication with the second memory. The second processing device is configured to receive transaction authorization data for initiating a transaction. The transaction authorization data includes data that identifies (i) the user, (ii) the merchant, and (iii) a transaction amount. The system additionally includes a computing platform having a third memory and a third processing device in communication with the third memory. The third memory stores a misappropriation detection and exposure assessment system that is executable by the third processor in real-time.

The misappropriation detection and exposure assessment system includes a data acquisition module configured to receive the transaction authorization data from the POS terminal and a data strategy match module configured to determine whether a portion of the transaction authorization data matches predetermined transaction authorization criteria. If the portion of the transaction data matches the criteria, the transaction is authorized. The misappropriation detection and exposure assessment system further includes a misappropriation and exposure indicator engine configured to, in response to the data strategy match module determining that that the transaction authorization data does not match the predetermined transaction authorization criteria, determine a misappropriation and exposure indicator based at least on a probability that the mobile communication device is within a predetermined close proximity distance to the POS terminal (i.e., located at the POS terminal). In addition, the misappropriation detection and exposure assessment system includes a segmentation and decisioning module configured to determine whether to (i) generate and communicate an alert to the mobile communication device that is configured to request that the user provide a response to authorize or deny the transaction, or (ii) automatically (a) authorize the transaction or (b) deny the transaction. The determination on whether the generate and communicate the alert or automatically authorize or deny transaction is based on user configuration and the misappropriation and exposure indicator.

In specific embodiments of the system, the misappropriation and exposure indicator engine is configured to determine the misappropriation and exposure indicator based at least on the probability that the mobile communication device is within a predetermined close proximity distance to the POS terminal, wherein the probability is based on (i) a closeness in distance between a last-in-time location of the mobile communication device as received from the location determining mechanism and a location of POS terminal, and (ii) historical user location data indicating a volume of instances in which the user travelled along a current route of the mobile communication device to the POS terminal versus number of instances in which the user travelled along the current route of the mobile communication device to destinations other than the POS terminal. In related embodiments of the system, the probability is based on, (iii) when the historical location data indicates that the user has not previously travelled to the POS terminal, historical other users location data indicating the volume of instances in which other users travelled along the current route of the mobile communication device to the POS terminal versus number of instances in which the other users travelled along the current route of the mobile communication device to destinations other than the POS terminal.

In other specific embodiments of the system, the misappropriation and exposure indicator engine is configured to determine the misappropriation and exposure indicator based further on previous responses to alerts communicated to the user for authorization of transactions that were being initiated at the merchant site and/or a variance in the transaction amount versus an average amount of previous transactions conducted by the user at the merchant site.

In still further specific embodiments of the system, the misappropriation detection and exposure assessment system further includes a merchant verification module configured to determine whether the merchant exceeds a predetermined misappropriation occurrence threshold, and (i) in response to determining that merchant does exceed the predetermined misappropriation occurrence threshold, generate and communicate an alert to the mobile communication device that is configured to request that the user provide a response to the alert that authorizes or denies the transaction, or (ii) in response to determining that merchant does not exceed the predetermined misappropriation occurrence threshold, implement the data strategy match module, to determine whether the transaction authorization data matches the predetermined transaction authorization criteria.

In other specific embodiments of the system, the data strategy match module is configured to determine whether the transaction authorization data matches predetermined transaction authorization criteria, wherein the predetermined transaction authorization criteria includes the location of the POS terminal and the current location of the mobile communication device is within a predetermined close proximity range, (ii) the user has conducted one or more previous transactions with at the merchant site, and (iii) the transaction amount is within a predetermined range based on amounts of the one or more previous transactions.

In still further specific embodiments of the system, the segmentation and decisioning module is further configured to determine to automatically (a) authorize the transaction based on the misappropriation and exposure indicator being below a first predetermined threshold, (b) deny the transaction based on the exposure assessment indicator being above a second predetermined threshold, or (c) generate and communicate the alert to the mobile communication device based on the exposure assessment indicator being above the first predetermined threshold and below the second predetermined threshold.

Moreover, in additional specific embodiments of the system, the segmentation and decisioning module is further configured to, in response to failing to receive the response to the alert within a predetermined time period, determine whether to automatically approve or deny authorization of the transaction based at least on one or more previous transactions by the user at the merchant site and the transaction amount is within a predetermined range based on amounts of the one or more previous transactions.

A computer-implemented method for detecting misappropriation and assessing exposure at a Point-of-Sale (POS) terminal transaction defines second embodiments of the invention, the computer-implemented method is executed by one or more processing devices and includes receiving, from a POS terminal located at a merchant site, transaction authorization data including data that identifies (i) a user, (ii) a merchant, and (iii) a transaction amount. In response to receiving the data, the method includes determining whether the transaction authorization data matches predetermined transaction authorization criteria and, if so, the transaction is authorized/approved. In response to determining that that the transaction authorization data does not match the predetermined transaction authorization criteria, the method further includes, determining a misappropriation and exposure indicator based at least on a probability that the mobile communication device is within a predetermined close proximity distance to the POS terminal. In addition, the method includes determining whether to (i) generate and communicate an alert to the mobile communication device that is configured to request that the user provide a response to authorize or deny the transaction, or (ii) automatically (a) authorize the transaction or (b) deny the transaction. The determination as to whether to generate and communicate the alert or automatically authorize or deny the transaction is based on user configuration and the misappropriation and exposure indicator.

In specific embodiments of the computer-implemented method, determining the misappropriation and exposure indicator further includes determining the misappropriation and exposure indicator based at least on the probability that the mobile communication device is within a predetermined close proximity distance to the POS terminal, wherein the probability is based on (i) a closeness in distance between a last-in-time location of the mobile communication device as received from the location determining mechanism and a location of POS terminal, and (ii) historical user location data indicating a volume of instances in which the user travelled along a current route of the mobile communication device to the POS terminal versus number of instances in which the user travelled along the current route of the mobile communication device to destinations other than the POS terminal. In related embodiments of the method, the probability is based on, (iii) when the historical location data indicates that the user has not previously travelled to the POS terminal, historical other users location data indicating the volume of instances in which other users travelled along the current route of the mobile communication device to the POS terminal versus number of instances in which the other users travelled along the current route of the mobile communication device to destinations other than the POS terminal.

In other specific embodiments of the computer-implemented method, determining the misappropriation and exposure indicator further includes determining the misappropriation and exposure indicator based further on at least one of (i) previous responses to alerts communicated to the user for authorization of transactions that were being initiated at the merchant site and (ii) a variance in the transaction amount versus an average amount of previous transactions conducted by the user at the merchant site.

In still further specific embodiments, the computer-implemented method includes determining whether the merchant exceeds a predetermined misappropriation occurrence threshold and (i) in response to determining that merchant does exceed the predetermined misappropriation occurrence threshold, generating and communicating an alert to the mobile communication device that is configured to request that the user provide a response to the alert that authorizes or denies the transaction, or (ii) in response to determining that merchant does not exceed the predetermined misappropriation occurrence threshold, determining whether the transaction authorization data matches the predetermined transaction authorization criteria.

In additional specific embodiments of the computer-implemented method of determining whether to (i) generate and communicate an alert to the mobile communication device, or (ii) automatically (a) authorize the transaction or (b) deny the transaction further includes determining to automatically (a) authorize the transaction based on the misappropriation and exposure indicator being below a first predetermined threshold, (b) deny the transaction based on the exposure assessment indicator being above a second predetermined threshold, or (c) generate and communicate the alert to the mobile communication device based on the exposure assessment indicator being above the first predetermined threshold and below the second predetermined threshold.

A computer program product including a non-transitory computer-readable medium defines third embodiments of the invention. The non-transitory computer-readable medium includes sets of codes for causing one or more computer to receive, from a POS terminal located at a merchant site, transaction authorization data including data that identifies (i) a user, (ii) a merchant, and (iii) a transaction amount. The sets of codes further cause the one or more computers to determine whether the transaction authorization data matches predetermined transaction authorization criteria and, in response to determining that that the transaction authorization data does not match the predetermined transaction authorization criteria, determine a misappropriation and exposure indicator based at least on a probability that the mobile communication device is within a predetermined close proximity distance to the POS terminal. The sets of codes further cause the one or more computers to determine whether to (i) generate and communicate an alert to the mobile communication device that is configured to request that the user provide a response to authorize or deny the transaction, or (ii) automatically (a) authorize the transaction or (b) deny the transaction. The determination is based on user configuration and the misappropriation and exposure indicator.

In specific embodiments of the computer program product, the set of codes for causing the one or more computers to determine the misappropriation and exposure indicator are further configured to cause the one or more computers to determine the misappropriation and exposure indicator based at least on the probability that the mobile communication device is within a predetermined close proximity distance to the POS terminal, wherein the probability is based on (i) a closeness in distance between a last-in-time location of the mobile communication device as received from the location determining mechanism and a location of POS terminal, and (ii) historical user location data indicating a volume of instances in which the user travelled along a current route of the mobile communication device to the POS terminal versus number of instances in which the user travelled along the current route of the mobile communication device to destinations other than the POS terminal. In related embodiments of the computer program product, the probability is based on, (iii) when the historical location data indicates that the user has not previously travelled to the POS terminal, historical other users location data indicating the volume of instances in which other users travelled along the current route of the mobile communication device to the POS terminal versus number of instances in which the other users travelled along the current route of the mobile communication device to destinations other than the POS terminal.

In other specific embodiments of the computer program product, the set of codes for causing the one or more computers to determine the misappropriation and exposure indicator are further configured to cause the one or more computers to determine the misappropriation and exposure indicator based further on at least one of (i) previous responses to alerts communicated to the user for authorization of transactions that were being initiated at the merchant site and (ii) a variance in the transaction amount versus an average amount of previous transactions conducted by the user at the merchant site.

Moreover, in other specific embodiments of the computer program product, the sets of codes further include a set of codes for causing the one or more computers to determine whether the merchant exceeds a predetermined misappropriation occurrence threshold, and (i) in response to determining that merchant does exceed the predetermined misappropriation occurrence threshold, generate and communicate an alert to the mobile communication device that is configured to request that the user provide a response to the alert that authorizes or denies the transaction, or (ii) in response to determining that merchant does not exceed the predetermined misappropriation occurrence threshold, determine whether the transaction authorization data matches the predetermined transaction authorization criteria.

Thus, according to embodiments of the invention, which will be discussed in greater detail below, the present invention addresses needs and/or achieves other advantages by preventing misappropriation and/or assessing the exposure posed by a transaction at a POS terminal, especially those transactions in which it is not possible to otherwise definitively determine that a user/transactor is present at the POS terminal. The invention relies on AI, in specific embodiments, a neural network implementing sequence modeling to predict the likelihood that a user/transactor is present at the POS terminal. Location of a user is tracked via a designated mobile communication device and in instances in which a location of the mobile communication cannot be identified at the time of the transaction, the invention performs analysis based at least on the last-in-time location of the mobile communication device and the user's travel route leading up to the last-in-time location of the mobile communication device to predict a likelihood that the user is located at the POS terminal. As a result of the predicted likelihood either the transaction is automatically decisioned or the user/transactor is alerted and requested to their approve or reject/deny the transaction.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
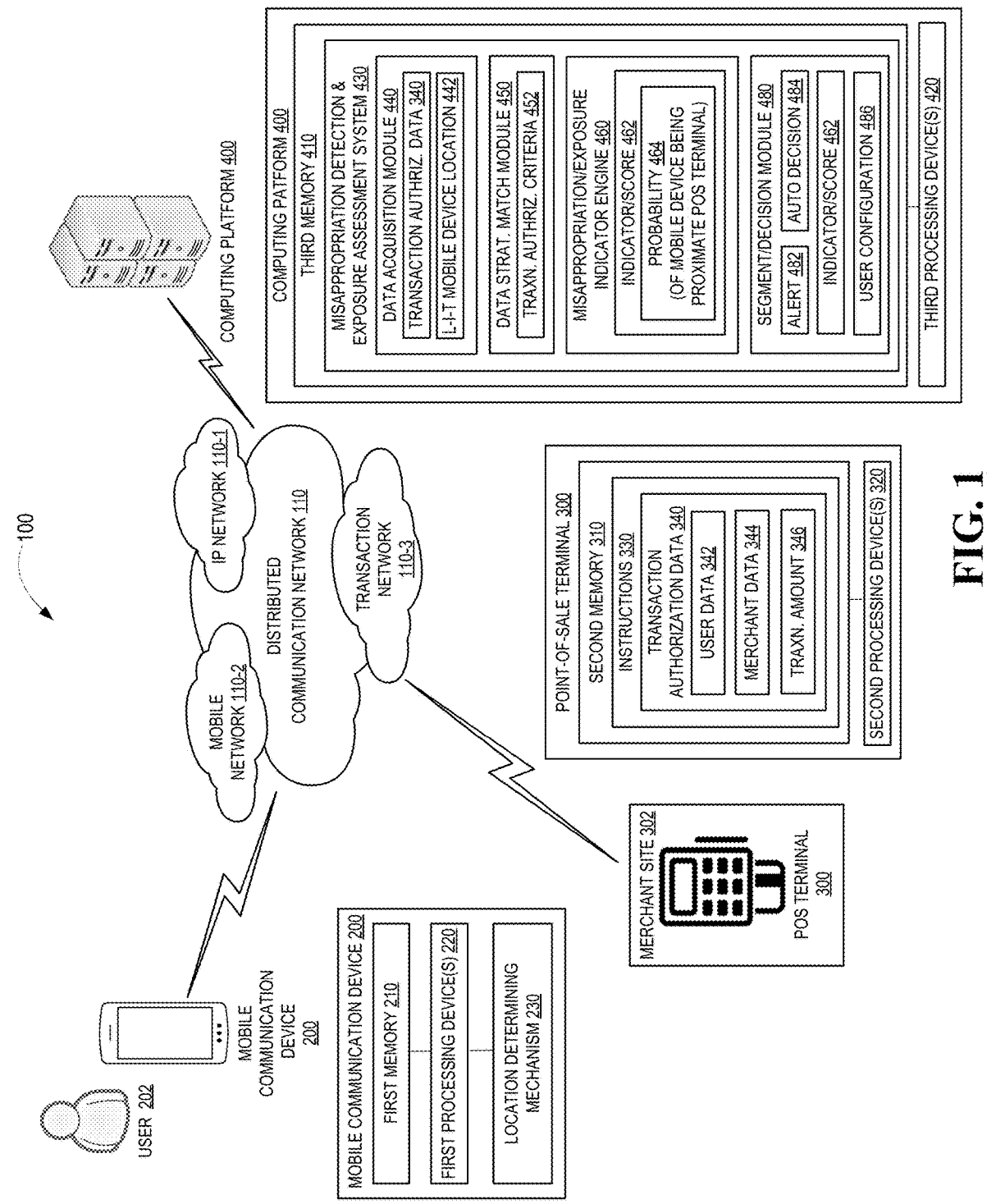
Figure 2:
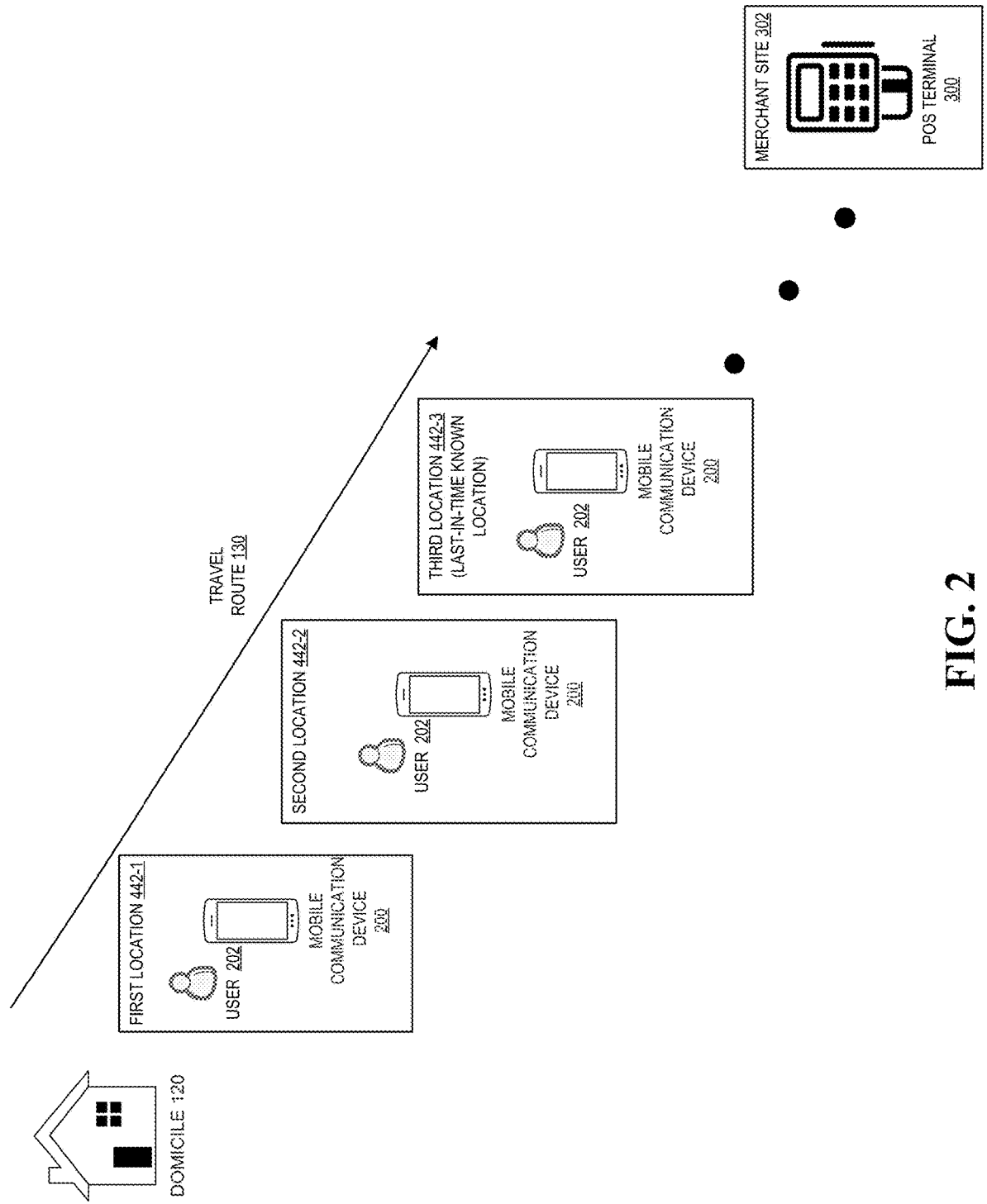
Figure 3:
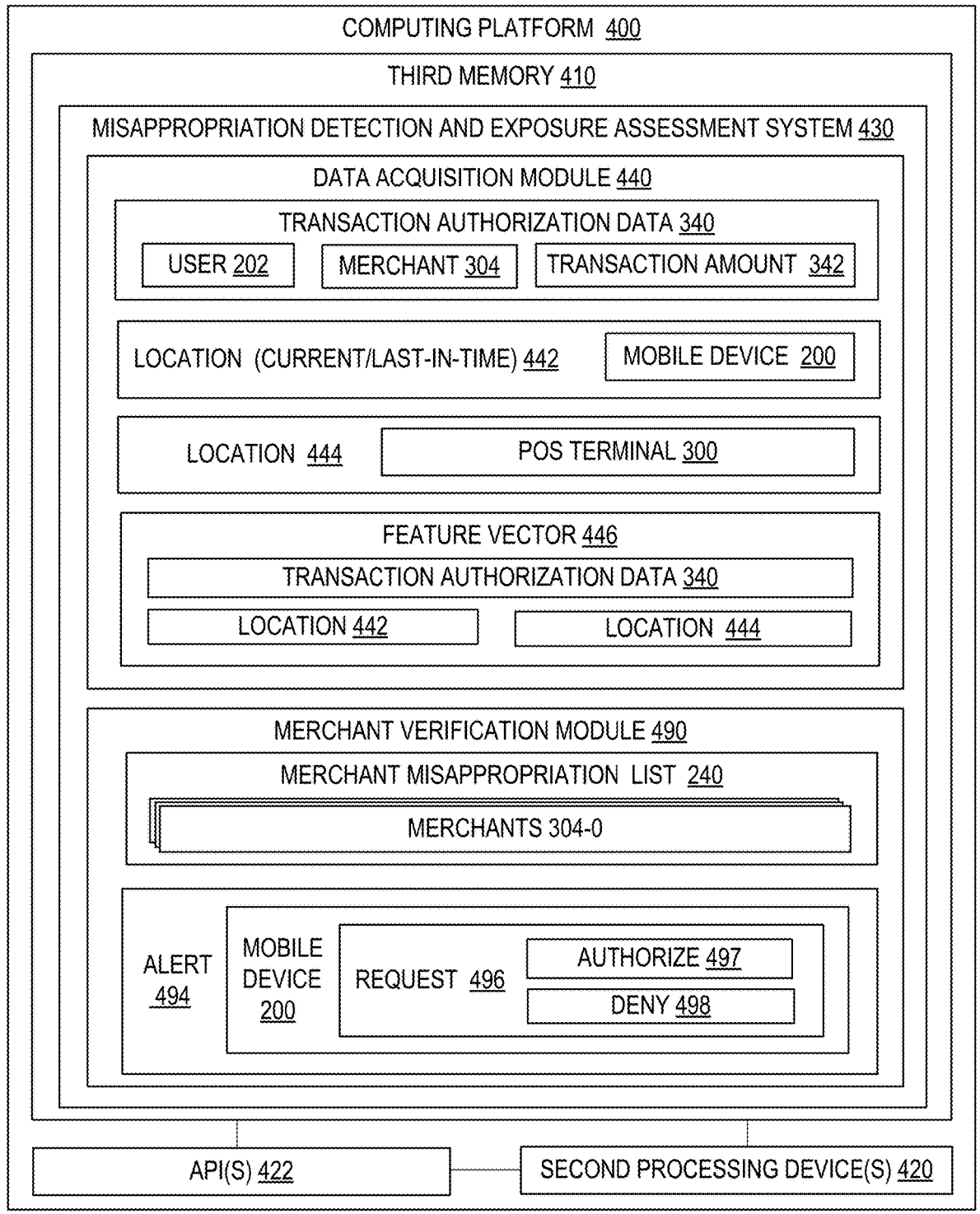
Figure 4:
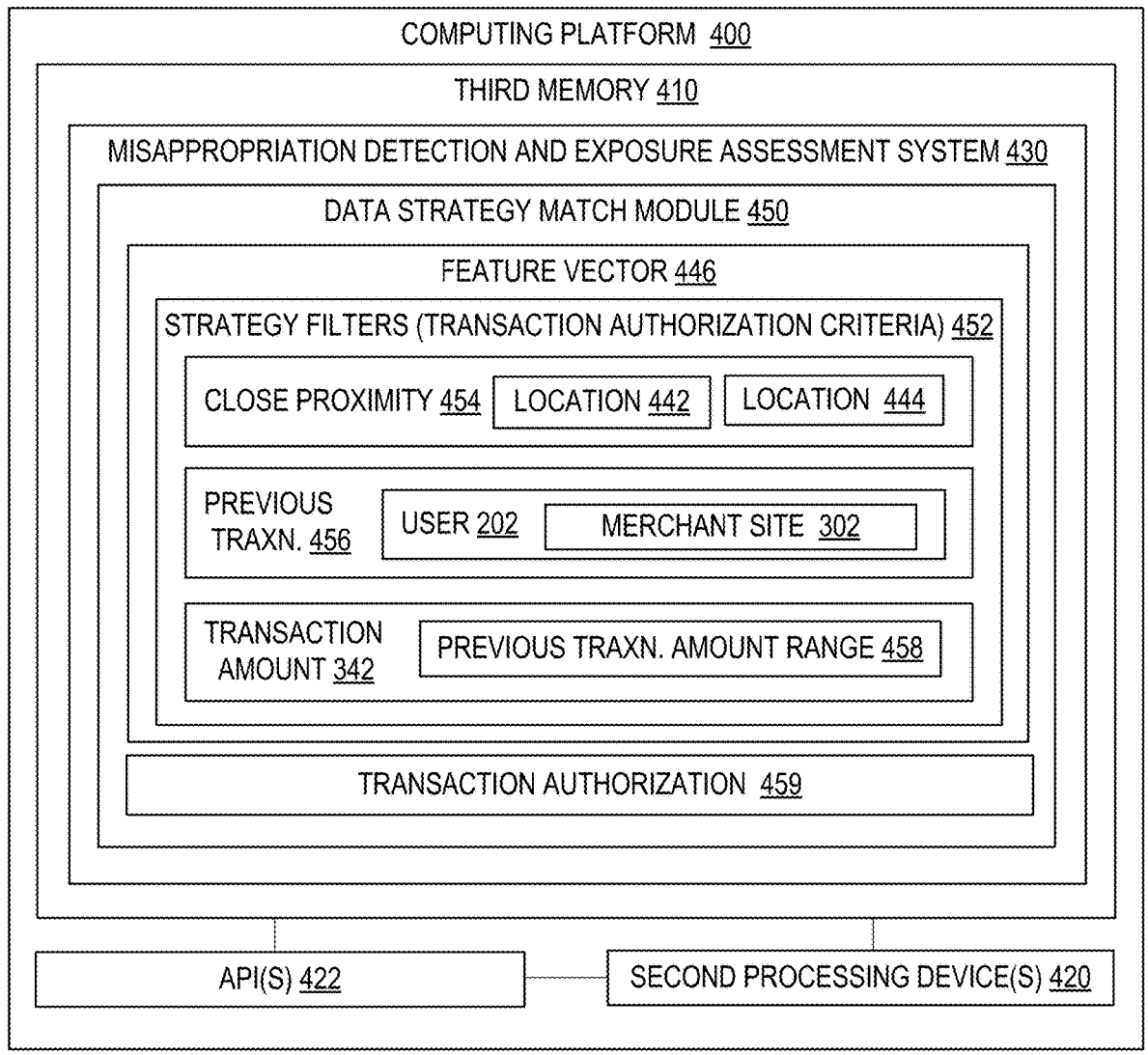
Figure 5:
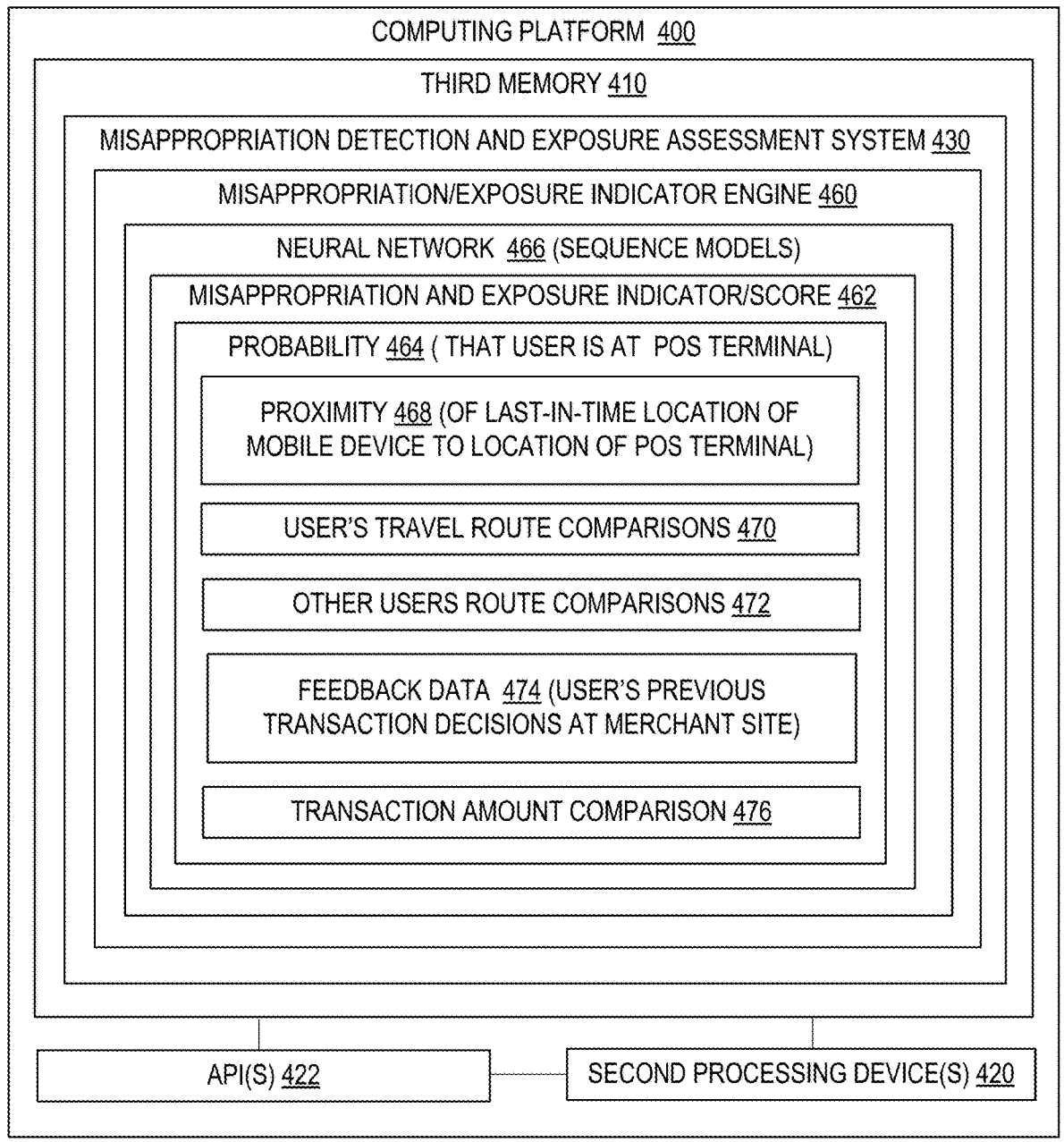
Figure 6:
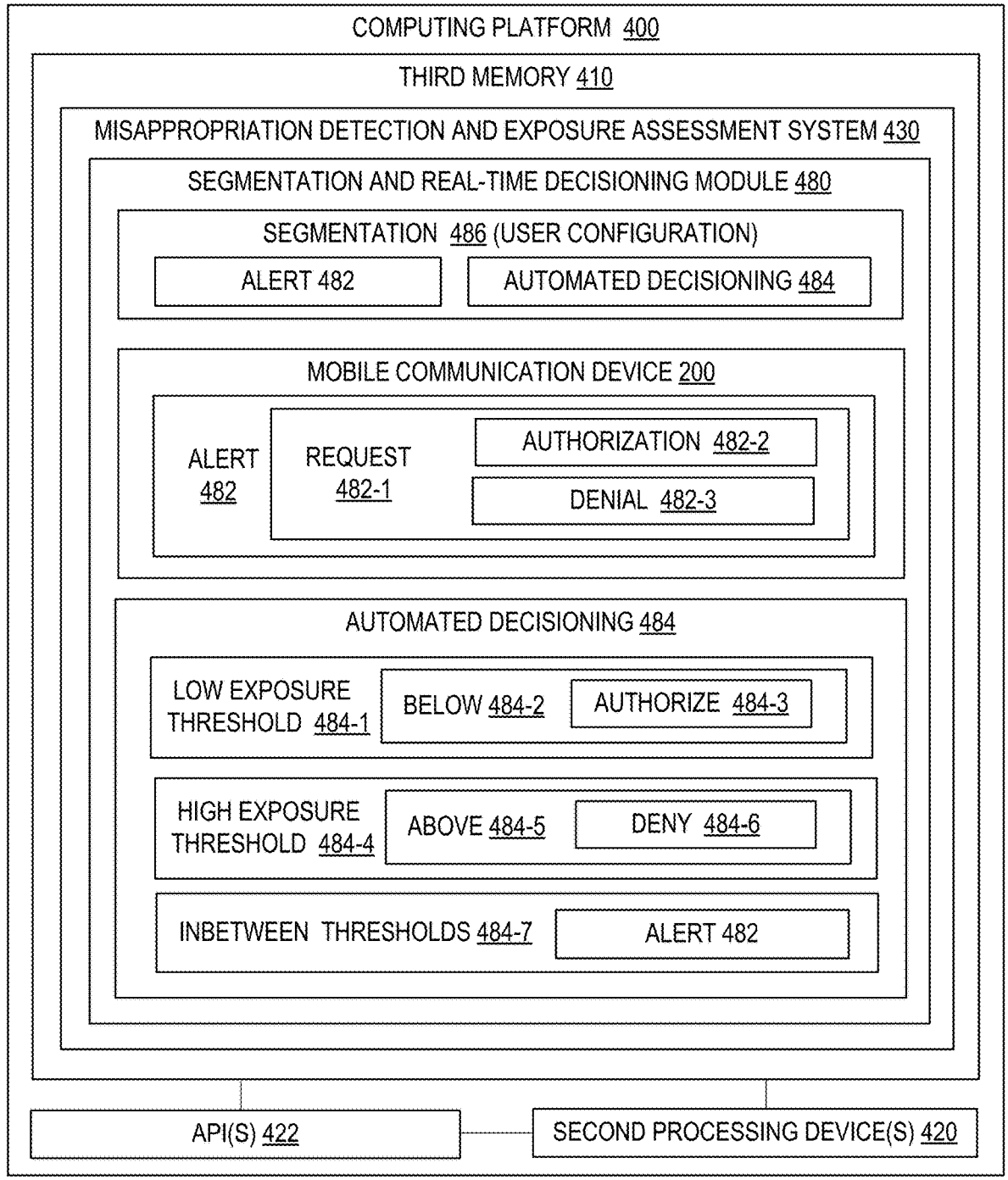
Figure 7:
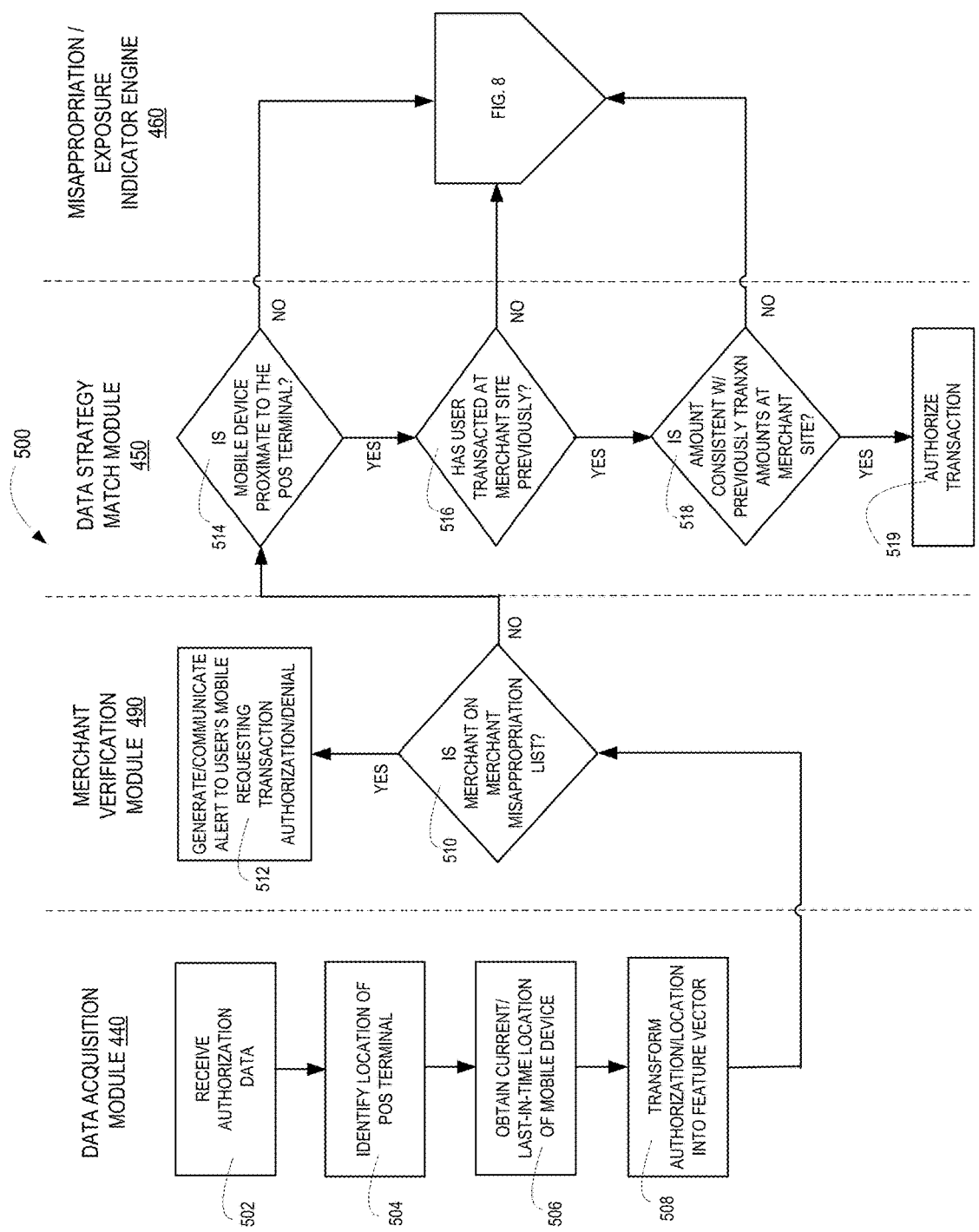
Figure 8:
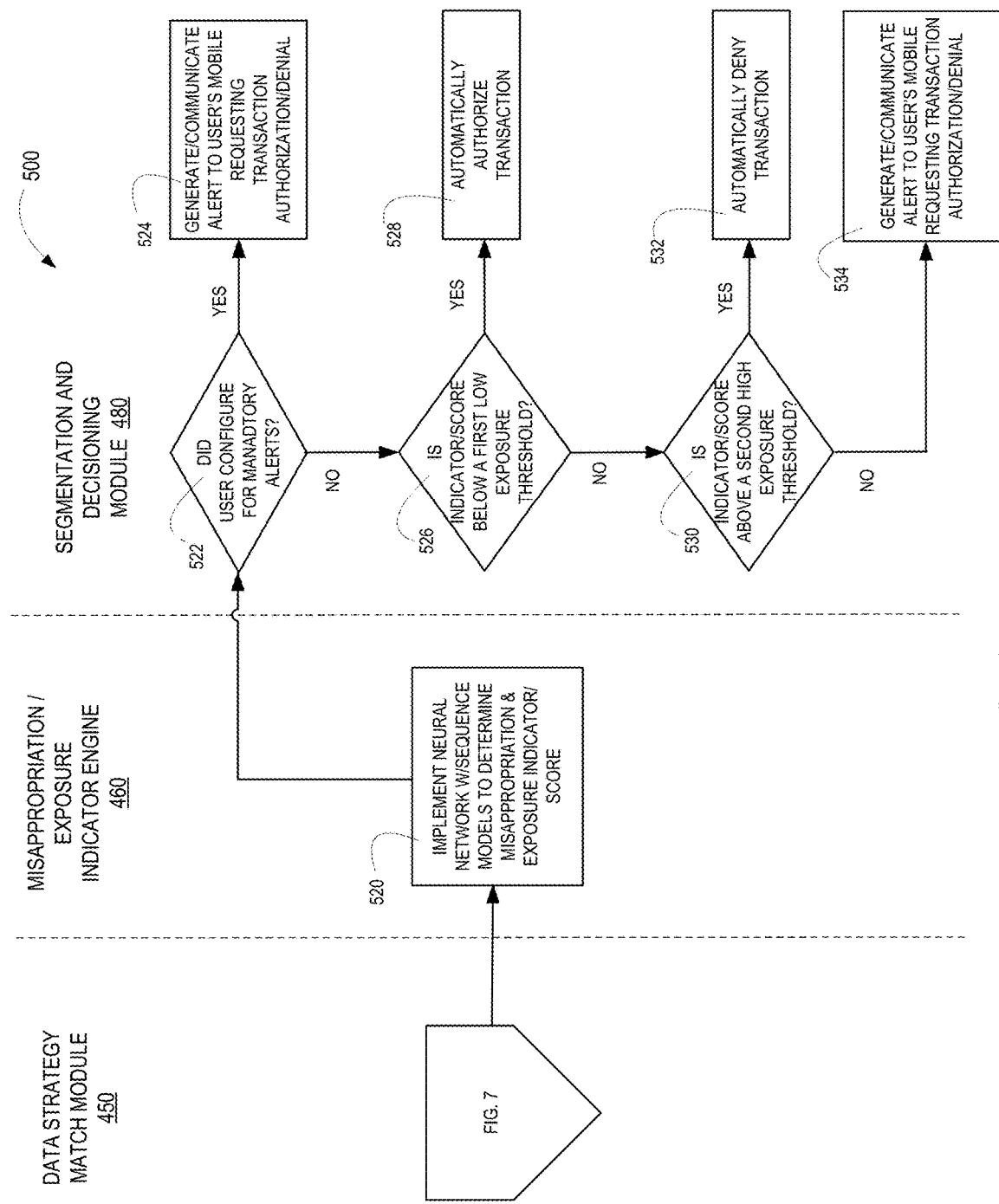
Figure 9:
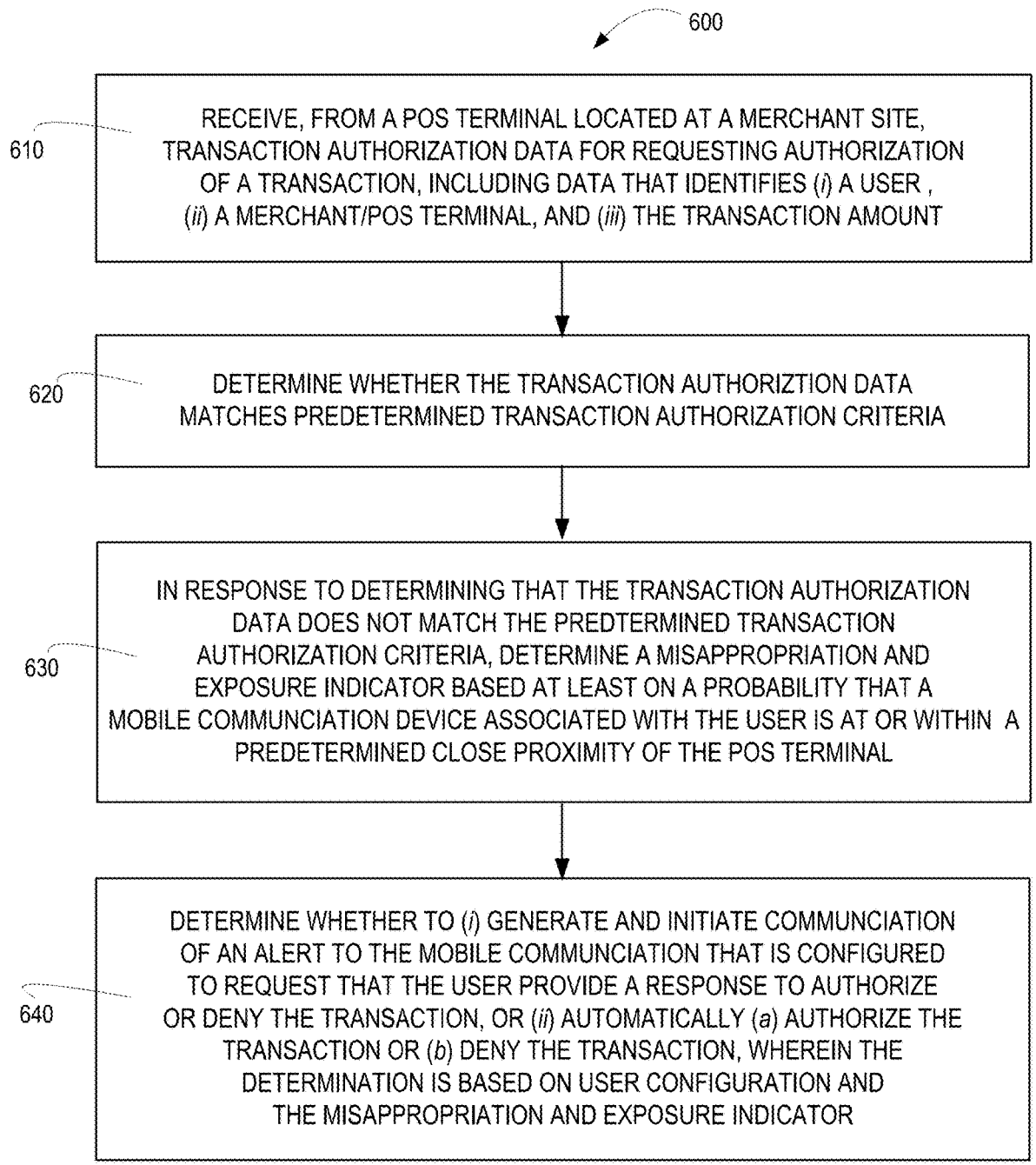

Having thus described embodiments of the disclosure in general terms, reference will now be made to the accompanying drawings, wherein:

FIG. 1 is a schematic/block of a system for misappropriation detection and exposure assessment at a POS terminal transaction, in accordance with embodiments of the present invention;

FIG. 2 is a schematic diagram illustrating a user's travel route to a POS terminal/merchant site and a last-in-time location of the user, in accordance with embodiments of the present invention;

FIG. 3 is a block diagram of computing platform including a misappropriation detection and exposure assessment system and highlighting the data acquisition and merchant verification modules, in accordance with alternate embodiments of the present invention;

FIG. 4 is a block diagram of computing platform including a misappropriation detection and exposure assessment system and highlighting the data match module, in accordance with alternate embodiments of the present invention;

FIG. 5 is a block diagram of computing platform including a misappropriation detection and exposure assessment system and highlighting the misappropriation/exposure indicator engine, in accordance with alternate embodiments of the present invention;

FIG. 6 is a block diagram of computing platform including a misappropriation detection and exposure assessment system and highlighting the segmentation and real-time decisioning module, in accordance with alternate embodiments of the present invention;

FIGS. 7 and 8 is a flow diagram of a method for assessing exposure and/or detecting misappropriation at a POS terminal transaction and real-time decisioning of the transaction, in accordance with embodiments of the present invention; and FIG. 9 is a flow diagram of a method for misappropriation detection and exposure assessment at a POS terminal transaction, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a highly effective, efficient and real-time approach to preventing misappropriation and/or assessing the exposure posed by a transaction at a POS terminal, especially those transactions in which it is not possible to otherwise definitively determine that a user/transactor is present at the POS terminal.

In this regard the invention utilizes Artificial Intelligence (AI), in specific embodiments, a neural network implementing sequence modeling to predict the likelihood that a user/transactor is present at the POS terminal. In this regard, the present invention tracks the location of a user designated mobile communication device and in instances in which a location of the mobile communication cannot be identified at the time of the transaction, the invention performs analysis based at least on the last-in-time location of the mobile communication device and the user's travel route leading up to the last-in-time location of the mobile communication device to predict a likelihood that the user is located at the POS terminal. Additional criteria for predicting the likelihood of the user being located at the POS terminal includes previous transactions conducted by the user/transactor at the POS terminal (or the merchant site of the POS terminal), the route taken by the user/transactor for the previous transactions at the POS terminal, the amount of the previous transactions at the POS terminal in comparison to the amount of the current transaction and the like.

As a result of the predicted likelihood, referred to herein as a misappropriation and exposure indicator/score, the present invention may be configured to alert the user/transactor of the pending transaction and request their approval or rejection/denial of the transaction or, in other instances the misappropriation and exposure indicator/score may provide for automated decisioning, whereby the transaction is authorized or rejected/denied based solely on the misappropriation and exposure indicator/score (i.e., without the need to alert or otherwise request the user's/transactor's approval or denial of the transaction).

Referring to FIG. 1, a schematic/block diagram is presented of a system 100 for real-time detection or misappropriation and/or exposure assessment in conjunction with a transaction occurring at a POS (Point-of-Sale) terminal, in accordance with embodiments of the present invention. The system 100 is implemented within a distributed communication network 110 that may include the Internet, one or more intranets, one or more cellular networks, one or more short-range wireless networks or the like. Specifically, in embodiments of the present invention the distributed communication network 110 includes IP (Internet Protocol) network 100-1, mobile/cellular network 110-2 and transaction/payment network 110-3.

The system a mobile communication device 200 that is in possession of a user/transactor 202. The mobile communication device 200 includes a first memory 210 that is in communication with one or more first processing devices 220, Additionally, mobile communication device 200 includes a location determining mechanism 230, such as a Global Positioning System (GPS) device or the like, that is executable by the one or more first processing devices 220 and is configured to determine the location of the mobile communication device. In specific embodiments of the system 100, the mobile communication device 200 comprises a mobile/cellular telephone, a smart watch or any other mobile communication device that is capable of determining location. According to the present invention, the user 202 will have acquiesced in participating in misappropriation prevention program and, thus, agreed to have their location tracked as a requirement for the misappropriation prevention program. As such, the user 202 will have pre-registered one or more mobile communication devices 200 (i.e., device(s) normally in the constant possession of the user) for location tracking purposes.

The system 100 additionally includes POS terminal 300 located at a merchant site 302 having a second memory 310 and one or more second processing devices 320 in communication with the second memory 310. The second memory 310 stores instructions 330 that are executable by the one or more second processing devices 320 and configured to read/receive transaction authorization data 340 in conjunction with a transaction occurring at the POS terminal 300. The transaction authorization data 340 may be read from a chip on a payment vehicle/card, scanned from barcodes on products being acquired, inputted by a user/transactee or the like. The transaction authorization data includes, but may not be limited to, user data 342 (e.g., payment account number or the like), merchant/POS terminal data 344 and transaction amount 346.

Additionally, system 100 includes a computing platform 400 having a third memory 410 and one or more third processing devices 420 in communication with the third memory. Third memory 410 stores misappropriation detection and exposure assessment system 430 that is configured to detect misappropriation and/or assess a level of exposure posed by the transaction occurring at the POS terminal 300. It should be noted that in specific embodiments of the invention, the computing platform 400 comprises one or more devices, such as application server(s) that are in network 110-3 communication with the POS terminal 300. While in other embodiments of the invention, the computing platform 400, specifically some of the modules functions of the misappropriation detection and exposure assessment system 430 may be included within the POS terminal 300.

The system 430 includes data acquisition module 440 that is configured to receive the transaction authorization data 340 from the POS terminal, as well as, last-in-time location data 442 for the mobile communication device 200. The transaction authorization data 340 may include geo-coordinates of the POS terminal 200 (included in the merchant/POS terminal data 302-1) or the data acquisition data 440 may be configured to perform a look-up of the POS terminal 300 location from a suitable database.

Additionally, the system 430 includes a data strategy match module 450 that is configured to determine whether the transaction authorization data 340 and location data 442 match predetermined transaction authorization criteria 452. For example, in specific embodiments of the invention, the transaction authorization criteria 452 includes (i) current co-location/close proximity of the mobile communication device 200 and the POS terminal 300, (ii) previous transactions by the user 202 at the merchant site 302, and (iii) current transaction amount consistent with the user's previous transaction amounts at the merchant site 302. If the data strategy match module 450 determines a match between the transaction authorization data 340/location data 442 and the predetermined transaction authorization criteria 452, the transaction is authorized absent the need to (i) alert the user 202, and (ii) perform subsequent misappropriation/exposure indicator/score 462 determination.

Further, the system 430 includes misappropriation/exposure indicator engine 460 that is configured to, in response to the data strategy engine module 450 determining that the transaction authorization data 340/location data 442 does not match the transaction authorization criteria 452, determine a misappropriation/exposure indicator/score 462 that is based, at least, on the probability 464 that the mobile communication device 200 is within a predetermined range (co-located or close proximity distance) of the POS terminal 300. In specific embodiments of the invention, misappropriation/exposure indicator engine 460 implements Artificial Intelligence (AI) and, more specifically, the engine 460 comprises a neural network that implements sequence modeling to determine the misappropriation/exposure indicator/score 462.

Moreover, system 430 includes a segmentation and decisioning module 480 that is configured to determine whether to (i) generate and initiate communication of an alert 482 to the mobile communication device 200 that requests that the user 202 provide a response to authorize or deny/reject the transaction, or (ii) automatically decision 484 the transaction (i.e., authorize or deny the transaction). The decision on whether to (i) or (ii) is based on user configuration 486 and the misappropriation/exposure indicator/score 462. In response to the determination, module 480 is configured to either generate and initiate communication of the alert 482 or perform the automated decisioning 484.

Referring to FIG. 2, a schematic diagram is presented that highlights the need to predict the location of the user 202 and, more specifically, predict the likelihood that the user 202 is co-located or proximate to the POS terminal 300 (i.e., the user 202 is the individual/transactor attempting to conduct a transaction at the POS terminal 300 and not a wrongful possessor of the user's payment card). The user 202 departs their domicile 120 and, by way of example only, first location 442-1, second location 442-2 and third location 442-3 are determined by the mobile communication device 200 and logged to a user location tracking database that is accessible to the misappropriation detection and exposure assessment system of the present invention. The locations 442-1, 442-2 and 442-3 define the user's travel route 130, which may or may not eventually lead to the POS terminal 300.

Subsequently, a transaction is initiated at the POS terminal 300 and the last-in-time location of the user's mobile communication device 200 indicates that the user was located at third location 442-3 (e.g., five minutes prior to initiation of the transaction). In other words, there is no current location data that indicates that the user's mobile communication device 200 is co-located with the POS terminal 300. As previously discussed, such may occur in instances in which the mobile communication device is currently not active/offline or the location determination mechanism is currently unable to report a location of the mobile communication device.

In such instances, the misappropriation/exposure indicator engine 460 determines an indicator/score 462 that is based on the probability 464 that the mobile communication device 200 is co-located or closely proximate to the POS terminal 300. In this regard, the invention serves to predict the likelihood that the user, travelling on travel route 130, has ended up at the POS terminal and, thus, is the individual conducting the transaction. The probability determination takes into account the time of the last-in-time location 442-3 (e.g., whether it is feasible that the user is currently located at the POS terminal 300 based on the timing of the last-in-time location determination), the proximity of the last-time location 442-3 to the location of the POS terminal (i.e., closer in proximity more likely at the POS terminal 300 as opposed to further in proximity less likely at the POS terminal 300), whether the travel route 130 was one used by the user 200 previously to travel to the POS terminal 300 and the like.

Referring to FIGS. 3-6 block diagrams are presented of a computing platform 400 that includes a misappropriation detection and exposure assessment system 430, in accordance with embodiments of the present invention. In addition to highlighting details of the misappropriation detection and exposure assessment system 430, FIGS. 3-6 describe various alternate embodiments of the invention. Computing platform 400 comprises one or more computing devices/apparatus, such as servers, POS terminals or the like configured to execute software programs, including instructions, engines, algorithms, modules, routines, applications, tools, and the like. Computer platform 400 includes third memory 410, which may comprise volatile and non-volatile memory, EPROM, EEPROM, or any memory common to computer platforms. Moreover, third memory 410 may comprise cloud storage, such as provided by a cloud storage service and/or a cloud connection service.

Further, computing platform 400 also includes third processing device(s) 420, which may be an application-specific integrated circuit ("ASIC"), or other chipset, logic circuit, or other data processing device. Third processing device(s) 420 may execute an application programming interface ("API") 422 that interfaces with any resident programs, such as misappropriation detection and exposure assessment system 430, and algorithms, sub-engines/routines associated therewith or the like stored in first third memory 410 of computing platform 400.

Third processing device(s) 420 may include various processing subsystems (not shown in FIGS. 3-6) embodied in hardware, firmware, software, and combinations thereof, that enable the functionality of computing platform 400 and the operability of computing platform 400 on a distributed communication network 110 (shown in FIG. 1). For example, processing subsystems allow for initiating and maintaining communications and exchanging data with other networked devices. For the disclosed aspects, processing subsystems of third processing device(s) 420 may include any subsystem used in conjunction with misappropriation detection and exposure assessment system 430, and related engines, routines, algorithms, sub-algorithms, modules, sub-modules thereof.

Computing platform 400 additionally includes a communications module (not shown in FIGS. 3-6) embodied in hardware, firmware, software, and combinations thereof, that enables electronic communications between computing platform 400 and other networks and/or networked devices, such as, POS terminal 300 and the like. Thus, the communication module may include the requisite hardware, firmware, software and/or combinations thereof for establishing and maintaining a network communication connection with one or more systems, platforms, networks, or the like.

Third memory 410 of computing platform 400 misappropriation detection and exposure assessment system 430. System 430 includes data acquisition module 440 that is configured to receive transaction authorization data 340 including user data 342, merchant/POS terminal data 344 and transaction amount 346. Additionally, data acquisition module obtains the last-in-time location 442 of the mobile communication device 200, which may be the current location of the mobile communication device and the location 444 of the POS terminal 300. As previously discussed the location 444 of the POS terminal 300 may be included within the transaction authorization data 430 as part of the merchant/POS terminal data 344 or may be obtained from a database that cross-references POS terminals 300 to locations (e.g., geo-coordinates). In specific embodiments of the invention, the data acquisition module 440 is further configured to transform the transaction authorization data 340 and locations 442 and 444 a feature vector 446.

Additionally, in alternate embodiments of the invention, system 430 includes merchant verification module 490 that is configured to determine whether the merchant 304 is listed amongst a merchant misappropriation list 492. Merchants 304-0 listed within the merchant misappropriation list 492 have experienced a high volume (e.g., predetermined number of occurrences of misappropriation over a predetermined time period) of misappropriation events. In response to determining that the merchant 304 is listed on the merchant misappropriation list 492, an alert 494 is generated and communicated to the mobile communication device 200 that notifies the user 202 of the high rate of occurrence of misappropriation at the merchant site 302 and is configured to include a request 496 for the user to respond with transaction authorization 497 or transaction denial/rejection 498. In the event that the user 202 does not respond to the request 496 within a predetermined time period, the transaction is automatically denied/rejected. In this regard, the alert 494 provides the user the ability to override the merchant's inclusion on the merchant misappropriation listing 492 and authorize/approval for the transaction for processing.

Referring to FIG. 4, a block diagram is presented of computing platform 400 in which third memory 410 stores misappropriation detection and exposure assessment system 430. Specifically, FIG. 4 highlights the details surrounding the data strategy match module 450, in accordance with embodiments of the present invention. In specific embodiments of the invention, the data strategy match module 450 receives the feature vector 446 from the data acquisition module and inputs the feature vector 446 into a series of strategy filters 452, which define the transaction authorization criteria. In specific embodiments of the invention, the strategy filters include (i) determining that the current location 442 of the user's mobile communication device 200 and the location 444 of the POS terminal are in close proximity 454 (i.e., co-located or within a predetermined close proximity range), (ii) determining that the user/transactor 202 has previous transactions 456 at the merchant site 302, and (iii) determining that the current transaction amount 342 is within a previous transaction amount range 458. In specific embodiments of the invention, all of the strategy filters/match criteria 452 must be met in order for the transaction authorization 459 to occur without the need to alert the user/transactor or to conduct further misappropriation/exposure indicator determination. In other words if the results of the strategy filters 452 is that the user 202 and the POS terminal 300 are not in close proximity 452, or the user 202 has not previously transacted at the merchant site 303, or the transaction amount 342 is not within the range of the user's previous transaction amounts 458 at the merchant site 302, the transaction will not undergo immediate transaction authorization 459 and the transaction will be subjected to further misappropriation/exposure indicator determination.

Referring to FIG. 5 a block diagram is presented of computing platform 400 in which third memory 410 stores misappropriation detection and exposure assessment system 430. Specifically, FIG. 5 highlights the details surrounding the misappropriation/exposure indicator engine 460, in accordance with embodiments of the present invention. As previously discussed, engine 460 implements Artificial Intelligence (AI) in the form of a neural network 466 that relies on sequence models to determine a misappropriation and exposure indicator/score 462. The misappropriation/exposure indicator/score 462 is based on the probability 464 that the user's mobile communication device 200 is located at or within a close proximity of the POS terminal 300. In specific embodiments of the invention, the probability 464 is based is based on the proximity 468 in both (i) location the last-in-time location of the user's mobile communication device 200 and the POS terminal 300 and (ii) time between the last-in-time location of the user's mobile communication device 200 and the transaction.

Additionally, the probability 464 determination relies on historical user location data to conduct user travel route comparisons 470 between the user's current travel route (i.e., last-in-time location and previous locations leading up to the last-in-time location) and previous instances of travel by the user along the same travel route. The comparisons 470 determine the number of instances in which the travel route previously led to the user's destination being the POS terminal 300 or merchant site 302 versus number of instances in which the travel route previously led to the user's destination being someplace other than the POS terminal 300. In other embodiments of the invention, in which the historical user location data indicates that the user has not previously travelled to the POS terminal 300 and/or merchant site 302, the probability 464 determination may rely on other users historical location data to conduct other users route comparisons 472 between the user's current travel route and previous instances of travel by other users along the same travel route. The comparison 472 determines the number of instances in which the other users travelling along the travel route led the other users' destination being the POS terminal 300 or merchant site 300 versus number of instances in which the travel route previously led to the other users' destination being someplace other than the POS terminal 300 or merchant site 302.

In addition, the probability 464 that the user's mobile communication device 200 is located at or within a close proximity of the POS terminal 300 is further based on feedback data 474 from previous transactions at the POS terminal 300/merchant site 302, specifically, the user's previous transaction decisions (i.e., responses to alerts communicated to the user 202) at the POS terminal 300/merchant site 302. For example, if the user 202 always authorizes the transaction even though the location data indicates that the user is not on route to the POS terminal, such decisioning may indicate that the user has authorized someone else to perform the transaction of their behalf at the POS terminal. In this regard, the neural network 466 operates in a machine learning mode whereby previous decisioning of prior transactions by the user 202 at the POS terminal 300/merchant site 302 have an affect on the misappropriation/exposure indicator/score 462 for the current transaction.

Moreover, the probability 464 determination is further based a transaction amount comparison 476, in which historical user transaction data is relied on the compare the current transaction amount 342 to historical transaction amounts of previous transactions conducted by the user at the POS terminal 300 or merchant site 302. In this regard, the closer the current transaction amount 342 is to previous transaction amounts the more likely the user 202 is the individual conducting the transaction at the POS terminal 300/merchant site 302 versus the farther apart the transaction amount 342 is to previous transaction amounts the less likely the user 202 is the individual conducting the transaction at the POS terminal 300/merchant site 302.

Referring to FIG. 6 a block diagram is presented of computing platform 400 in which third memory 410 stores misappropriation detection and exposure assessment system 430. Specifically, FIG. 6 highlights the details surrounding the segmentation and real-time decisioning module 480, in accordance with embodiments of the present invention. Specifically, segmentation 486 is performed to determine whether the user has configured the system 430 for user alerts 482 in all instances (i.e., regardless of the misappropriation/exposure indicator/score 462) or for automated decisioning 484 in which the transactions may be automatically decisioned based on the misappropriation/exposure indicator/score 462. If segmentation, results in a finding of user alerts 482 in all instances, an alert 482 is generated and communication of such is initiated to the user's mobile communication device 200. The alert 482 is configured to request 482-1 that the user 202 provide a response for either authorization 482-2 of the transaction or denial/rejection 482-3 of the transaction. The alert may also provide indication of the misappropriation/exposure indicator score 462 and/or the level of exposure associated with the indicator/score (i.e., high-exposure, low-exposure or the like). In the event that the user 202 does not respond to the alert 482 within a predetermined time period, the transaction may be rejected/denied or further decisioning processing may occur based on the misappropriation/exposure indicator/score 462 or other factors.

Automated decisioning 484 is based on the misappropriation/exposure indicator/score 462. In specific embodiments of the invention, if the misappropriation/exposure indicator/score 462 is at or below 484-2 a low-exposure indicator/score threshold 484-1 the transaction is automatically authorized 484-3 and if the misappropriation/exposure indicator/score 462 is above 484-5 a high-exposure indicator/score threshold 484-4 (different from the low-exposure indicator/score threshold 484-1) the transaction is automatically denied/rejected 484-6. However, if the misappropriation/exposure indicator/score 462 is in-between 484-7 the thresholds 484-1, 484-4 (i.e., above the low-exposure indicator/score and below the high-exposure indicator/score), an alert 482 is generated and communicated to the user's mobile communication device that requests the user to provide a response/input that either authorizes or rejects/denies the transaction.

Referring to FIGS. 7-8, a flow diagram is depicted of a method 500 for detecting misappropriation and assessing exposure at a POS terminal transaction, in accordance with embodiments of the present invention. Events 504-508 occur as part of processing performed by the data acquisition module 440 of the misappropriation detection and exposure assessment system. At Event 502, authorization data is received from a POS terminal that identifies the user/transactor, the POS terminal/merchant and the transaction amount. At Event 504, the location of the POS terminal is identified. The location or the POS terminal may be the identified within the authorization data or the location may be determined by accessing a database that associated POS terminals with their locations. At Event 506, the current location, or if unobtainable the last-in-time location, of the user's/transactor's mobile communication device is obtained. The user/transactor will have pre-registered for misappropriation protection which entails tracking the location of the user's mobile communication device. At Event 508, the authorization and location data is transformed into a feature vector.

Events 510-512 occur as part of processing performed by the merchant verification module 490 of the misappropriation detection and exposure assessment system. At Decision 510, a determination is made as to whether the merchant is currently listed on a misappropriation list. The merchant misappropriation list lists merchants at which misappropriation occurrences currently exceeds a predetermined level of misappropriation occurrences. If the merchant is determined to be on the merchant misappropriation list, at Event 512, an alert is generated and communicated to the user's mobile communication device that alerts the user of the merchant's misappropriation status and requests a response/input from the user to either authorize the transaction or reject/deny the transaction. The response to the alert forms the basis for decisioning (i.e., authorizing or denying) the transaction and the results of the response are fed back (not shown in FIGS. 8 and 9) to the misappropriation and exposure indicator engine 460 for machine learning purposes.

Events 514-519 occur as part of processing performed by the data strategy match module 450 of the misappropriation detection and exposure assessment system. If the merchant is not found to be currently listed on the merchant misappropriation listing, at Decision 514, a determination is made as to whether the user's mobile communication device is co-located or otherwise in close proximity to the POS terminal. If the user' mobile communication is determined to be co-located or in close proximity to the POS terminal, at Decision 516 a determination is made as to whether the user has previously transacted at the merchant site/POS terminal. Such a determination is made by accessing the user's transaction history. If the user is determined to have previously transacted at the merchant site/POS terminal, at Decision 518, a determination is made as whether the current transaction amount is consistent with previous transaction amounts of the transactions performed by the user at the merchant site/POS terminal. If all Decisions 514, 516 and 518 are answered in the affirmative (i.e., the user's mobile communication device is co-located with the POS device, the user has transacted at the merchant site/POS previously and the current transaction amount is consistent with previous transaction amounts at the merchant site/POS terminal), at Event 519, the transaction is authorized without a need to alert the user/transactor or to perform further misappropriation detection or exposure assessment.

Referring to FIG. 8, Event 520 is performed by the misappropriation/exposure indicator engine 460 of the misappropriation detection and exposure assessment system. If any of Decisions 514, 516, and 518 are answered in the negative (i.e., the user's mobile communication device is not co-located with the POS device, or the user has not transacted at the merchant site/POS previously or the current transaction amount is not consistent with previous transaction amounts at the merchant site/POS terminal), at Event 520, a neural network with sequence modeling is implemented to determine a misappropriation and exposure indicator/score that is based on a probability/likelihood that the user's mobile communication device (and, thus, the user) are currently located at or in close proximity to the POS terminal. The probability/likelihood is based on the (i) the proximity in location of the last-in-time location of the user's mobile communication device and the POS terminal, (ii) the proximity in time between the last-in time location of the user's mobile communication device and the transaction, (iii) the user's historical travel route data indicating a volume of instances in which the user's current travel route resulted in the POS terminal as the destination versus a volume of instances in which the user's current travel route resulted in other destinations. In those embodiments in which it is determined that the user has not previously transacted at the POS terminal/merchant site, the probability/likelihood may be further based on (iv) the other users historical travel route data indicating a volume of instances in which the other users travelling on the user's current travel route resulted in the POS terminal as the destination versus a volume of instances in which the other users' travelling on the user's travel route resulted in other destinations.

Moreover, the misappropriation and exposure indicator/score is determined based on other factors/parameters, including, but not limited to, feedback from previous transactions conducted by the user at the POS terminal (i.e., responses to alerts communicated to the user as a result of transactions performed at the POS terminal/merchant site). In addition, the indicator/score may be further based on the variance between the current transaction amount and previous transactions amounts of the user's previous transactions at the POS terminal/merchant site.

Events 514-519 occur as part of processing performed by the segmentation and real-time decisioning module 480 of the misappropriation detection and exposure assessment system. At Decision 522, a determination is made as to whether the user configured the system for mandatory alerts. If the determination is made that the user is configured for mandatory alerts, at Event 524, an alert is generated and communicated to the user's mobile communication device that is configured to request that the user respond with authorization or denial of the transaction. The alert may also indicate the level of exposure associated with the transaction based on the misappropriation/exposure indicator. The response to the alert forms the basis for decisioning (i.e., authorizing or denying) the transaction and the results of the response are fed back (not shown in FIGS. 8 and 9) to the misappropriation and exposure indicator engine 460 for machine learning purposes.

If the user has not configured the system for mandatory alerts, at a Decision 526, a determination is made as to whether the misappropriation/exposure indicator/score is below a first low-exposure threshold. If the misappropriation/exposure indicator/score is determined to be below the first, low-exposure threshold, at Event 528, the transaction is authorized. If the misappropriation/exposure indicator/score is determined to not below the first, low-exposure threshold, at Decision 530, a determination is made as to whether the misappropriation/exposure indicator/score is above a second, high-exposure threshold. If the misappropriation/exposure indicator/score is determined to be below the second, high-exposure threshold, at Event 532, the transaction is denied/rejected.

If the misappropriation/exposure indicator/score is not below the first low-exposure threshold or above the second high-exposure threshold (i.e., the indicator/score is between the two thresholds), at Event 534, an alert is generated and communicated to the user's mobile communication device that is configured to request that the user respond with authorization or denial of the transaction. The response to the alert forms the basis for decisioning (i.e., authorizing or denying) the transaction and the results of the response are fed back (not shown in FIGS. 8 and 9) to the misappropriation and exposure indicator engine 460 for machine learning purposes.

Referring to FIG. 9, a flow diagram is depicted of a method 600 for detecting misappropriation and/or assessing exposure posed by a transaction at a POS terminal, in accordance with embodiments of the present invention. At Event 610, transaction authorization data is received from a POS terminal located at a merchant. The transaction authorization data includes, but is not limited to, (i) user/transactor data (e.g., account number associated with the user), (ii) merchant/POS terminal data (e.g., POS terminal identifying data and location identifying data) and (iii) transaction amount data. In addition, the current location (or, if unavailable, the last-in-time location) of a pre-registered user mobile communication device is obtained. The user will have pre-registered the mobile communication device for location tracking as a requisite of the misappropriation detection and exposure assessment program.

At Event 620, a determination is made as to whether the transaction authorization data and location data matched predetermined authorization criteria. The predetermined authorization criteria may include, but is not limited to, co-location of the POS terminal and user's mobile communication device, previous transactions by the user at the POS terminal/merchant site, and the current transaction amount being consistent with previous transaction amounts of transactions conducted by the user at the POS terminal/merchant site. If all of the predetermined authorization criteria is met, the transaction is authorized without the need to perform further analysis (i.e., without the need to calculate a misappropriation/exposure indicator/score).

In response to determining that the transaction authorization and location data does mat match the predetermined transaction authorization criteria, at Event 630, a misappropriation and exposure indicator is determined which is based at least on the probability that the user's mobile communication device (and, thus, the user) is located at or close in proximity to the POS terminal (i.e., the user/transactor is the individual attempting to conduct the transaction). The probability that the user's mobile communication device is co-located with the POS terminal is based on (i) the proximity in location of the last-in-time location of the user's mobile communication device and the POS terminal, (ii) the proximity in time between the last-in time location of the user's mobile communication device and the transaction, (iii) the user's historical travel route data indicating a volume of instances in which the user's current travel route resulted in the POS terminal as the destination versus a volume of instances in which the user's current travel route resulted in other destinations. In those embodiments in which it is determined that the user has not previously transacted at the POS terminal/merchant site, the probability/likelihood may be further based on (iv) other users historical travel route data indicating a volume of instances in which the other users travelling on the user's current travel route resulted in the POS terminal as the destination versus a volume of instances in which the other users' travelling on the user's travel route resulted in other destinations. In addition, the misappropriation and exposure indicator/score is determined based on other factors/parameters, including, but not limited to, feedback from previous transactions conducted by the user at the POS terminal (i.e., responses to alerts communicated to the user as a result of transactions performed at the POS terminal/merchant site) and the variance between the current transaction amount and previous transactions amounts of the user's previous transactions at the POS terminal/merchant site.

At Event 640, a determination is made as to whether to (i) generate and communicate an alert to the user's mobile communication that notifies the user of the pending transaction and requests that the user provide a response that either accepts/authorizes the transaction or denies/rejects the transaction, or (ii) automatically authorize or deny transaction. The determination is based on user configuration and the misappropriation and exposure indicator/score. In specific embodiments of the method, if the determination results in automatically authorizing or denying the transaction, the transaction may be authorized if the misappropriation/exposure indicator/score falls below a low-exposure threshold and denied if the indicator/score is above a high-exposure threshold. In the even that the misappropriation/exposure indicator/scores falls between the low-exposure threshold and the high-exposure threshold, the user alert may be generated and communicated to the user's mobile communication device that notifies the user of the pending transaction and requests that the user provide a response that either accepts/authorizes the transaction or denies/rejects the transaction.

Thus, as described in detail above, present embodiments of the invention include systems, methods, computer program products and/or the like for preventing misappropriation and/or assessing the exposure posed by a transaction at a POS terminal, especially those transactions in which it is not possible to otherwise definitively determine that a user/transactor is present at the POS terminal. The invention relies on AI, in specific embodiments, a neural network implementing sequence modeling to predict the likelihood that a user/transactor is present at the POS terminal. Location of a user is tracked via a designated mobile communication device and in instances in which a location of the mobile communication cannot be identified at the time of the transaction, the invention performs analysis based at least on the last-in-time location of the mobile communication device and the user's travel route leading up to the last-in-time location of the mobile communication device to predict a likelihood that the user is located at the POS terminal. As a result of the predicted likelihood either the transaction is automatically decisioned or the user/transactor is alerted and requested to their approve or reject/deny the transaction.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for detecting misappropriation and assessing exposure at a Point-of-Sale (POS) terminal transaction, the system comprising:
  a mobile communication device associated with a user and including a first memory, a first processing device in communication with the memory and a location determining mechanism in communication with the first processing device;
  a POS terminal located at a merchant site including a second memory and a second processing device in communication with the second memory, wherein the second processing device is configured to receive transaction authorization data for initiating a transaction, wherein the transaction authorization data includes data that identifies (i) the user, (ii) the merchant, and (iii) a transaction amount; and
  a computing platform including a third memory and a third processing device in communication with the third memory, wherein the third memory stores a misappropriation detection and exposure assessment system that is executable by the third processor in real-time and includes:
    a data acquisition module configured to receive (i) the transaction authorization data from the POS terminal and (ii) a last-in-time known location of the mobile communication device,
    a data strategy match module configured to determine that the transaction authorization data does not match predetermined transaction authorization criteria, wherein the predetermined transaction authorization criteria determined not to match includes the last-in-time known location of the mobile communication device and a location of the POS terminal,
    a misappropriation and exposure indicator engine configured to, in response to the data strategy match module determining that the transaction authorization data does not match the predetermined transaction authorization criteria based on a determination that the last-in-time known location of the mobile device does not match the location of the POS terminal, implement Artificial Intelligence (AI) comprising a neural network including sequence modeling to determine a misappropriation and exposure indicator that is based on a probability that the mobile communication device is currently co-located with the POS terminal, wherein the probability is based on (i) a closeness in distance between the last-in-time location of the mobile communication device and a location of the POS terminal, (ii) historical user location data indicating a volume of instances in which the user travelled along a current route of the mobile communication device to the POS terminal versus number of instances in which the user travelled along the current route of the mobile communication device to destinations other than the POS terminal, and (iii) historical other users location data indicating a third volume of instances in which other users travelled along the current route of the mobile communication device to the POS versus a fourth volume of instances in which other users travelled along the current route of the mobile communication device to destinations other than the POS terminal, and a segmentation and decisioning module configured to determine whether to generate and communicate an alert to the mobile communication device that is configured to request that the user provide a response to authorize or deny the transaction, or (ii) automatically (a) authorize the transaction or (b) deny the transaction, wherein the determination is based on user configuration and the misappropriation and exposure indicator.

2. The system of claim 1, wherein the misappropriation and exposure indicator engine is configured to determine the misappropriation and exposure indicator based further on previous responses to alerts communicated to the user for authorization of transactions that were being initiated at the merchant site.

3. The system of claim 1, wherein the misappropriation and exposure indicator engine is configured to determine the misappropriation and exposure indicator based further on a variance in the transaction amount versus an average amount of previous transactions conducted by the user at the merchant site.

4. The system of claim 1, wherein the misappropriation detection and exposure assessment system further includes a merchant verification module configured to determine whether the merchant exceeds a predetermined misappropriation occurrence threshold, (i) in response to determining that merchant does exceed the predetermined misappropriation occurrence threshold, generate and communicate an alert to the mobile communication device that is configured to request that the user provide a response to the alert that authorizes or denies the transaction, and (ii) in response to determining that merchant does not exceed the predetermined misappropriation occurrence threshold, implement the data strategy match module, to determine whether the transaction authorization data matches the predetermined transaction authorization criteria.

5. The system of claim 1, wherein the data strategy match module is configured to determine that the transaction authorization data does not match predetermined transaction authorization criteria, wherein the predetermined transaction authorization criteria further includes at least one of (i) the user has conducted one or more previous transactions at the merchant site, and (ii) the transaction amount is within a predetermined range based on amounts of the one or more previous transactions.

6. The system of claim 1, wherein the segmentation and decisioning module is further configured to determine to automatically (a) authorize the transaction based on the misappropriation and exposure indicator being below a first predetermined threshold, (b) deny the transaction based on the exposure assessment indicator being above a second predetermined threshold, or (c) generate and communicate the alert to the mobile communication device based on the exposure assessment indicator being above the first predetermined threshold and below the second predetermined threshold.

7. The system of claim 1, wherein the segmentation and decisioning module is further configured to, in response to failing to receive the response to the alert within a predetermined time period, determine whether to automatically approve or deny authorization of the transaction based at least on one or more previous transactions by the user at the merchant site and the transaction amount is within a predetermined range based on amounts of the one or more previous transactions.

8. A computer-implemented method for detecting misappropriation and assessing exposure at a Point-of-Sale (POS) terminal transaction, the computer-implemented method is executed by one or more processing devices and comprising:

receiving, from a POS terminal located at a merchant site, (a) transaction authorization data including data that identifies (i) a user, (ii) a merchant, and (iii) a transaction amount and (b) a last-in-time known location of the mobile communication device;

determining that the transaction authorization data does not match predetermined transaction authorization criteria, wherein the predetermined transaction authorization criteria determined not to match includes the last-in-time known location of the mobile communication device and a location of the POS terminal;

in response to determining that the transaction authorization data does not match the predetermined transaction authorization criteria based on a determination that the last-in-time known location of the mobile device does not match the location of the POS terminal, implementing Artificial Intelligence (AI) comprising a neural network including sequence modeling to determine a misappropriation and exposure indicator that is based on a probability that the mobile communication device is currently co-located with the POS terminal, wherein the probability is based on (i) a closeness in distance between the last-in-time location of the mobile communication device and a location of the POS terminal, (ii) historical user location data indicating a volume of instances in which the user travelled along a current route of the mobile communication device to the POS terminal versus number of instances in which the user travelled along the current route of the mobile communication device to destinations other than the POS terminal, and (iii) historical other users location data indicating a third volume of instances in which other users travelled along the current route of the mobile communication device to the POS versus a fourth volume of instances in which other users travelled along the current route of the mobile communication device to destinations other than the POS terminal; and determining whether to (i) generate and communicate an alert to the mobile communication device that is configured to request that the user provide a response to authorize or deny the transaction, or (ii) automatically (a) authorize the transaction or (b) deny the transaction, wherein the determination is based on user configuration and the misappropriation and exposure indicator.

9. The computer-implemented method of claim 8, wherein determining the misappropriation and exposure indicator further comprises determining the misappropriation and exposure indicator based further on at least one of (i) previous responses to alerts communicated to the user for authorization of transactions that were being initiated at the merchant site and (ii) a variance in the transaction amount versus an average amount of previous transactions conducted by the user at the merchant site.

10. The computer-implemented method of claim 8, further comprising:

determining whether the merchant exceeds a predetermined misappropriation occurrence threshold;

in response to determining that merchant does exceed the predetermined misappropriation occurrence threshold, generating and communicating an alert to the mobile communication device that is configured to request that the user provide a response to the alert that authorizes or denies the transaction; and in response to determining that merchant does not exceed the predetermined misappropriation occurrence threshold, determining whether the transaction authorization data matches the predetermined transaction authorization criteria.

11. The computer-implemented method of claim 8, wherein (Original) determining whether to (i) generate and communicate an alert to the mobile communication device, or (ii) automatically (a) authorize the transaction or (b) deny the transaction further comprises determining to automatically (a) authorize the transaction based on the misappropriation and exposure indicator being below a first predetermined threshold, (b) deny the transaction based on the exposure assessment indicator being above a second predetermined threshold, or (c) generate and communicate the alert to the mobile communication device based on the exposure assessment indicator being above the first predetermined threshold and below the second predetermined threshold.

12. A computer program product including a non-transitory computer-readable medium, the non-transitory computer-readable medium comprising sets of codes for causing one or more computer to:
  receive, from a POS terminal located at a merchant site, (a) transaction authorization data including data that identifies (i) a user, (ii) a merchant, and (iii) a transaction amount and (b) a last-in-time known location of the mobile communication device;
  determine that the transaction authorization data does not match predetermined transaction authorization criteria, wherein the predetermined transaction authorization criteria determined not to match includes the last-in-time known location of the mobile communication device and a location of the POS terminal;
  in response to determining that the transaction authorization data does not match the predetermined transaction authorization criteria based on a determination that the last-in-time known location of the mobile device does not match the location of the POS terminal, implement Artificial Intelligence (AI) comprising a neural network including sequence modeling to determine a misappropriation and exposure indicator that is based on a probability that the mobile communication device is currently co-located with the POS terminal, wherein the probability is based on (i) a closeness in distance between the last-in-time location of the mobile communication device and a location of the POS terminal, (ii) historical user location data indicating a volume of instances in which the user travelled along a current route of the mobile communication device to the POS terminal versus number of instances in which the user travelled along the current route of the mobile communication device to destinations other than the POS terminal, and (iii) historical other users location data indicating a third volume of instances in which other users travelled along the current route of the mobile communication device to the POS versus a fourth volume of instances in which other users travelled along the current route of the mobile communication device to destinations other than the POS terminal; and
  determine whether to (i) generate and communicate an alert to the mobile communication device that is configured to request that the user provide a response to authorize or deny the transaction, or (ii) automatically (a) authorize the transaction or (b) deny the transaction, wherein the determination is based on user configuration and the misappropriation and exposure indicator.

13. The computer program product of claim 12, wherein the set of codes for causing the one or more computers to determine the misappropriation and exposure indicator are further configured to cause the one or more computers to determine the misappropriation and exposure indicator based further on at least one of (i) previous responses to alerts communicated to the user for authorization of transactions that were being initiated at the merchant site and (ii) a variance in the transaction amount versus an average amount of previous transactions conducted by the user at the merchant site.

14. The computer program product of claim 12, wherein the sets of codes further comprise a set of codes for causing the one or more computers to determine whether the merchant exceeds a predetermined misappropriation occurrence threshold, and (i) in response to determining that merchant does exceed the predetermined misappropriation occurrence threshold, generate and communicate an alert to the mobile communication device that is configured to request that the user provide a response to the alert that authorizes or denies the transaction, or (ii) in response to determining that merchant does not exceed the predetermined misappropriation occurrence threshold, determine whether the transaction authorization data matches the predetermined transaction authorization criteria.

* * * * *